Figure 3:
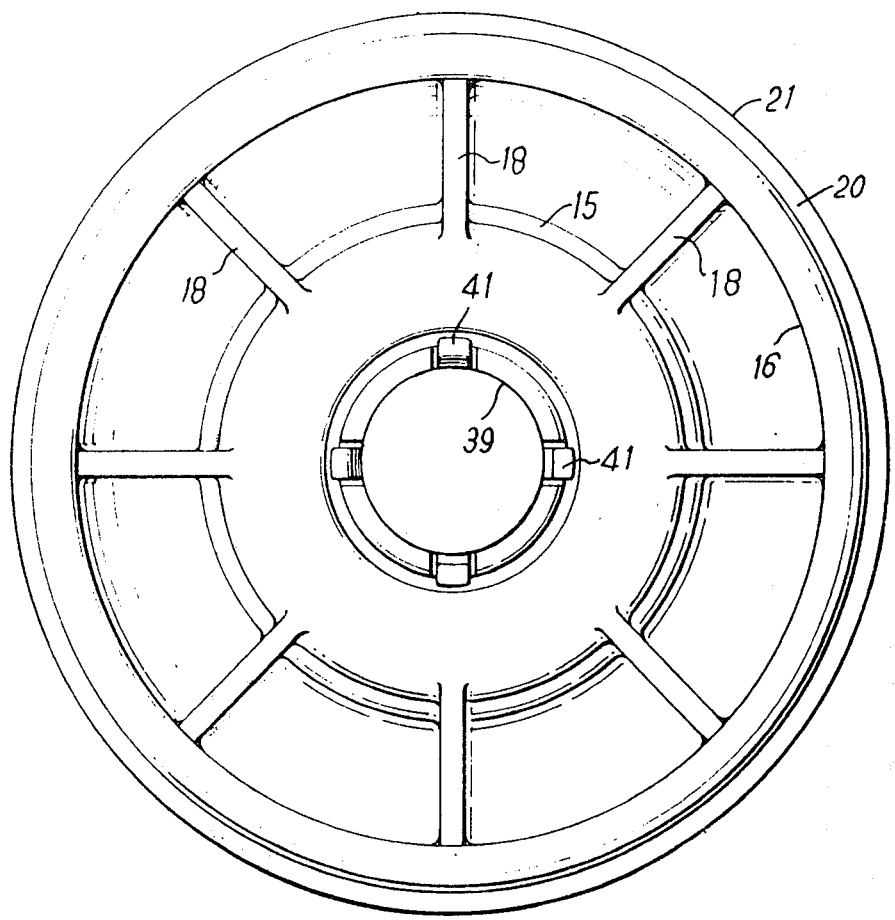

United States Patent [19]

Greener et al.

[11] 4,315,566
[45] Feb. 16, 1982

[54] END CAP ASSEMBLIES FOR CONVEYOR ROLLERS

[75] Inventors: Brian Greener, Welwyn Garden City; Simon J. Pedder, Luton, both of England

[73] Assignee: SKF (U.K.) Limited, Bedfordshire, England

[21] Appl. No.: 128,892

[22] Filed: Mar. 10, 1980

[30] Foreign Application Priority Data

Mar. 9, 1979 [GB] United Kingdom ............... 08393/79

[51] Int. Cl.³ .................... B65G 39/09; F16C 13/02
[52] U.S. Cl. ........................................ 193/37; 29/119; 308/20; 308/189 R; 308/190
[58] Field of Search ............ 308/20, 26, 187.1, 187.2, 308/189 R, 193, 184 R, 195, DIG. 11, 190, 191; 193/37; 29/110, 119, 121.1

[56] References Cited

U.S. PATENT DOCUMENTS

| | | | |
|---|---|---|---|
| 1,660,512 | 2/1928 | Jaenicke | 308/20 |
| 1,720,255 | 7/1929 | Adams | 308/20 |
| 1,876,534 | 9/1932 | Adams | 308/20 X |
| 1,881,896 | 10/1932 | Olson | 308/20 |
| 2,768,725 | 10/1956 | Foulds et al. | 308/20 X |
| 2,779,639 | 1/1957 | Bainbridge | 308/20 X |
| 3,255,858 | 6/1966 | Reilley | 193/37 |
| 3,957,147 | 5/1976 | Specht | 308/20 X |
| 4,017,128 | 4/1977 | Setete et al. | 308/189 R X |

FOREIGN PATENT DOCUMENTS

| | | | |
|---|---|---|---|
| 1009862 | 6/1957 | Fed. Rep. of Germany | 308/189 R |
| 2740302 | 3/1978 | Fed. Rep. of Germany | 308/20 |
| 1219425 | 3/1959 | France | 308/20 |

*Primary Examiner*—Stuart S. Levy
*Attorney, Agent, or Firm*—Browdy and Neimark

[57] ABSTRACT

A conveyor roller comprises a roller tube fitted with end cap assemblies incorporating bearings for rotatably mounting the roller tube on a fixed shaft. Each end cap assembly comprises a housing molded in resilient plastics material, one portion of the housing forming a substantially rigid annular frame which supports the bearing, and another portion of the housing forming a spring support which surrounds the frame and is of a size to be a sliding fit within an end of the roller tube, the outer end of the support being spaced radially from the housing. An end cover has an annular flange which is a close fit in the bearing. The end cap assembly is secured in position by swaging the end of the tube so as to force the outer end of the spring support radially inwards against the rigid housing. The external surface of the housing is curved, so that the spring support and the end portion of the tube are deflected to the curvature of the external surface of the housing.

4 Claims, 4 Drawing Figures

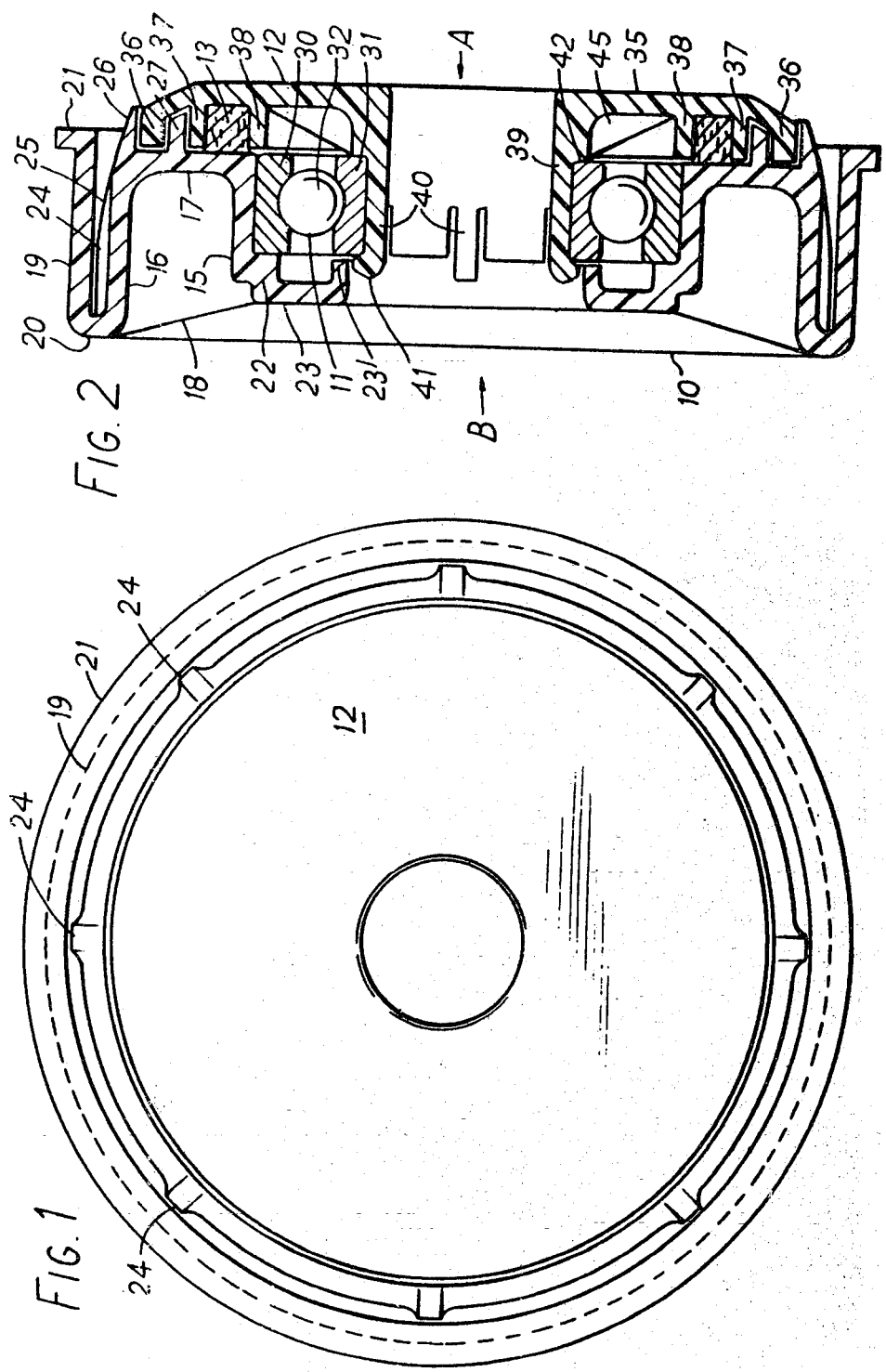

END CAP ASSEMBLIES FOR CONVEYOR ROLLERS

This invention relates to conveyor rollers of the kind comprising a roller tube fitted with end cap assemblies incorporating bearings for rotatably mounting the roller tube on a fixed shaft.

It is known to secure end cap assemblies in conveyor roller tubes by swaging the tube onto each end cap assembly, the end cap housing being deformed at the same time as the tube is reduced in diameter by the swaging operation. It is also known to swage steel roller tubes onto end cap assemblies having rigid housings made of plastics material moulded to the final shape which will be taken up by the deformed steel tube. It is however difficult to obtain an acceptable rotational secure fit by swaging a tube down on to such a preformed, rigid, moulded plastics housing, since the steel tube when deformed is subject to a degree of "springback" which reduces or can even remove the force acting between the housing and the steel tube.

The object of the invention is to provide an improved construction of end cap assembly having a housing of plastics material which can be firmly secured radially in a roller tube by swaging the tube.

According to the invention there is provided an end cap assembly for a roller tube of a conveyor roller, comprising a housing of plastics material and a bearing in said housing for rotatably mounting the assembly on a shaft, one portion of the housing forming a substantially rigid annular frame which supports the bearing therein, and another portion of the housing forming a spring support which surrounds the frame and is of a size to be a sliding fit within an end of the roller tube, one end of the support being integral with the frame, and the other end of the support being spaced from the frame and movable radially inwards against its own resilient resistance to deformation into abutting contact with the annular frame, wherein the external surface of the annular frame is curved radially inwards in a direction away from said one end of the spring support, whereby, upon mounting the end cap assembly in an end of a roller tube with said one end of the support axially innermost, the end of the roller tube may be swaged radially inwards to force the spring support into engagement with the frame with at least part of the spring support lying along the curved external surface of the frame, so as to secure the end cap assembly firmly in the roller tube.

The end cap assembly of the invention has the advantage that, when the end of a roller tube is swaged onto the end cap assembly with the spring support forced radially inwards onto the rigid annular frame and thereby deflected to the curvature of the external surface of the frame, the end portion of the roller tube is also deflected to the curvature of the spring support and thereby maintains contact therewith along a substantial proportion of the length of the spring support. This feature ensures that there is a firm frictional fit of the end cap assembly in the roller tube.

In addition, the curvature of the external surface of the frame ensures that, when the spring support is forced inwards against the frame, the strain in the spring support will not exceed a predetermined value determined by the radius of curvature of the external surface of the frame.

The spring support can conveniently comprise a cylindrical sleeve supported at one end thereof on an external wall of the frame of the end cap housing by a bight portion of U-shaped cross section integral with the sleeve and the external wall. The sleeve may be slit longitudinally to increase its flexibility. Alternatively, the spring support may comprise spring fingers spaced around the frame or a spring lattice framework positioned around the rigid frame of the housing.

Figure 4:
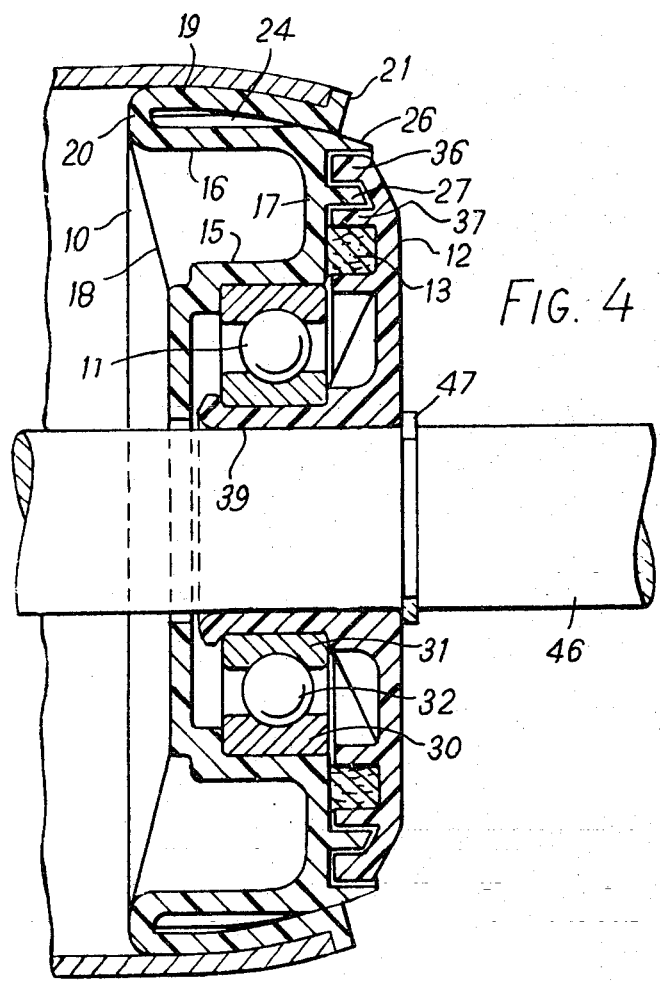

An embodiment of the invention will now be described, by way of example with reference to the accompanying drawings, in which:

FIG. 1 is an end view of an end cap assembly for a conveyor roller, taken in the direction of arrow A in FIG. 2, FIG. 2 is a cross sectional side elevation of the end cap assembly of FIG. 1, FIG. 3 is an end view of the end cap assembly taken in the direction of arrow B in FIG. 2, and FIG. 4 is a cross sectional side elevation of one end of a conveyor roller incorporating the end cap assembly of FIGS. 1-3.

The end cap assembly shown in the drawings comprises a housing 10 fitted with a ball bearing 11, an end cover 12 engaged as a snap fit in the bore of the bearing, and an annular felt seal 13 compressed between the housing and the end cover.

The housing 10 is made of a resilient plastics material, preferably glassfibre reinforced nylon, and comprises a cylindrical inner wall 15, a cylindrical outer wall 16 surrounding the inner wall 15, an end wall 17 integral with adjacent ends of the walls 15, 16, and a plurality of radial webs 18 (FIG. 3) spaced around the housing and extending between the inner and outer walls 15, 16, the webs 18 being integral with the walls 15, 16, 17. A cylindrical sleeve 19 surrounds the wall 16 and is connected thereto at the end remote from end wall 17 by an annular bight portion 20 of U-shaped cross section, to form a spring support for the end cap assembly. The end of the sleeve 19 remote from the bight portion 20 is formed with a radial flange 21. The end of the cylindrical inner wall 15 remote from wall 17 is formed with an annular step 22 forming an abutment for the bearing 11, and a further end wall 23 integral with the step 22 extends radially inwards as shown in FIG. 2. The inner periphery of the end wall 23 is formed with an axially-extending annular flange 23' which terminates close to the inner ring of the bearing.

The outside surface of the outer wall 16 of the housing is formed with a plurality of axially extending ribs 24 spaced around the housing, each rib being radially aligned with one of the radial webs 18. The ends of the ribs 24 adjacent the bight portion 20 have radially outer surfaces 25 which are flat and parallel and spaced close to the inside surface of the sleeve 19, and the remainder of the radially outer surfaces 25 of the ribs are curved radially inwards in the axial direction away from the bight portion 20. The end wall 17 is formed with two concentric annular tongues 26, 27 on the side remote from the webs 18, the radially outer tongue 26 having a curved outer surface which forms an extension of the curved outer surfaces 25 of the ribs 24.

The ball bearing 11 comprises an outer bearing ring 30, an inner bearing ring 31 and balls 32 in rolling engagement with grooved tracks on the rings 30, 31 so that the bearing is capable of resisting radial forces and axial forces in both directions. The outer ring 30 is a tight fit against the inside surface of the cylindrical wall 15 and abuts against the step 22.

The end cover 12 is also made of resilient plastics material, preferably unfilled nylon, and comprises an annular disc 35 formed on one side with three concentric annular tongues 36, 37, 38 and a cylindrical flange 39 at the centre of the disc 35. The free end of flange 39 is split axially and formed into four resilient fingers 40 having enlarged ends 41 which extend through the bore of the inner bearing ring 31 and engage as a snap fit on the chamfer thereof, and the centre portion of the flange 39 is formed with an annular step 42 which abuts against the adjacent face of the inner bearing ring when the enlarged ends on the fingers engage the opposite side of the inner bearing ring, thereby axially locating the end cover relative to the bearing and the housing 10. The radially outer tongue 36 on the cover projects between the tongues 26, 27 on the housing, and the tongue 37 on the cover is spaced close to the tongue 27 on the housing, so as to provide a narrow tortuous gap between the tongues 37, 27, 36, 26 forming a labyrinth seal between the housing and the cover.

The annular felt seal 13 is mounted as a close fit in the annular recess formed between the tongues 37, 38 on the cover, and has an axial width such that it is compressed between the cover and the housing so as to be in rubbing contact with the end wall 17 of the housing upon rotation of the housing relative to the cover. The seal 13 thus closes off the radially inner end of the narrow gap of the labyrinth seal. The annular recess 45 between the tongue 38 and the cylindrical flange 39 on the cover is filled with grease for lubricating the bearing, the seal 13 preventing escape of the grease through the labyrinth.

The end cap assembly is designed for use with a cylindrical steel roller tube having an internal diameter such that the sleeve 19 of the end cap assembly is a hand push-fit within the roller tube, the roller tube having an external diameter which is not smaller than that of the flange 21. The end cap assembly is secured in position in the end of the roller tube, with the flange 21 abutting the end of the tube, by swaging the end of the roller tube radially inwards, that is reducing the diameter of the end of the roller tube by external pressure, so as to force the sleeve 19 against the ribs 24 on the housing as shown in FIG. 4. The walls 15, 16, 17 and the radial webs 18 form a substantially rigid frame which resists deformation under the swaging pressure applied to the roller tube. The swaging operation is preferably controlled by a pressure transducer designed to prevent the swaging pressure exceeding a predetermined maximum value.

In the swaging operation the sleeve 19 is forced against the ribs 24 so that it is deflected to the curvature of the ribs. Similarly, the end portion of the roller tube is deflected to the curvature of the sleeve 19. A major portion of the sleeve thus lies along the length of the ribs, and the end portion of the tube lies along the length of the sleeve 19.

The end of the roller tube must of course be deformed beyond its elastic limit so as to prevent or reduce "spring-back" of the roller tube. The housing of the end cap assembly is however made of plastics material having a higher degree of elasticity than the metal of the roller tube. The length of the sleeve 19 and the radius of curvature of the outer surfaces 25 of the ribs 24 and tongue 26 are such that, when the sleeve 19 is forced onto the ribs 24 and the tongue 26, the strain in the sleeve 19 does not exceed a predetermined value at any point along its length. Thus, after the swaging operation, the sleeve 19 acts as a spring which provides and maintains a force between the housing and the bore of the roller tube should "spring-back" occur in the tube after the swaging tool has been removed. Since the roller tube is deflected to the same curvature as that of the sleeve 19, the tube maintains contact with the sleeve along a substantial proportion of its length, and this ensures that the end cap assembly remains as a firm non-rotational fit within the roller tube. The end cap assembly is course secured against outward axial movement by the swaged end of the roller tube, and against inward axial movement by engagement of the flange 21 against the end of the roller tube. The external diameter of the end of the roller tube is not less than that of the flange 21, to ensure that the swaging tool contacts the steel tube and not the flange 21 during the swaging operation.

The strain in the housing material is preferably the maximum under which significant creep or relaxation of the plastics sufficient to loosen the fit of the end cap in the roller tube will not occur in service.

The end cap assembly, fitted in the roller tube, is mounted on a shaft 46 (FIG. 4) fixed in the frame of a conveyor, the shaft 46 being a close sliding fit in the bore of the cylindrical flange 39 on the cover. The end cap assembly is axially located by a circlip 47 engaged in a groove in the shaft as shown in FIG. 4.

We claim:

1. An end cap assembly for a roller tube of a conveyor roller, comprising a housing of plastics material and a bearing supported in said housing for rotatably mounting the roller on a fixed shaft, said housing comprising an annular frame and a resilient collar surrounding the frame, said frame having an axially extending inner wall, an axially extending outer wall, and a plurality of radial webs spaced around said frame and extending between said inner and outer walls thereof so as to provide a substantially rigid structure to said frame in which a load acting on the outer wall thereof is transmitted through said webs and distributed substantially evenly along the inner wall, said bearing being mounted as a force fit in the bore defined by said inner wall of the frame, and said collar having an end thereof integral with one end of said outer wall of the frame with the remainder of the collar spaced radially from the outer wall of the frame and movable radially inwards against its own resilient resistance to deformation into abutting contact with said outer wall of the frame, said collar being formed at the free end thereof with an outwardly projecting radial flange, whereby, upon mounting the end cap assembly in an end of a roller tube of a size to receive the collar as a close sliding fit, with the radial flange abutting the end of the roller tube, the end of the roller tube is swageable radially inwards to force the collar into abutting engagement with the outer wall of the frame so as to secure the end cap assembly firmly in the roller tube, wherein the outer surface of said outer wall of the frame is curved radially inwards in a direction away from said one end thereof over at least part of the length of said outer wall so that, when the end portion of the tube is swaged inwards to force the collar against the rigid frame, part of the collar lies along the curved outer surface of the outer wall and is deformed to the curvature thereof and the end portion of the roller tube lies along the curved collar and is deformed to the curvature thereof.

2. An end cap assembly for a roller tube of a conveyor roller, comprising a housing of plastics material and a bearing supported in said housing for rotatably mounting the roller on a fixed shaft, said housing having an annular frame portion, a resilient collar portion surrounding the frame portion, and an annular bight portion of U-shaped section connecting said collar portion to said frame portion, said frame portion having an axially extending inner wall, an axially extending outer wall, and a plurality of radial webs spaced around said frame portion and extending between said inner and outer walls thereof so as to provide a substantially rigid structure to said frame portion in which a load acting on the outer wall thereof is transmitted through said webs and distributed substantially evenly along the inner wall, said bearing being mounted as a force fit in the bore defined by said inner wall of the frame portion, said collar portion having a cylindrical wall formed at one end thereof with an outwardly projecting radial flange, and said bight portion having one limb thereof integral with and aligned with the other end of said cylindrical wall of the collar portion and the other limb of said bight portion integral with and aligned with an end of said outer wall of the frame portion, said collar portion being spaced radially from the frame portion and movable radially inwards against its own resilient resistance to deformation into abutting contact with the annular frame, whereby, upon mounting the end cap assembly in an end of a roller tube of a size to receive the cylindrical wall of the collar portion as a close sliding fit, with said radial flange abutting the end of the roller tube, the end of the roller tube is swageable radially inwards to force the collar portion into engagement with the frame so as to secure the end cap assembly firmly in the collar tube, wherein the outer surface of said outer wall of the frame portion is curved radially inwards in a direction away from the bight portion over at least part of the length of said outer wall so that, when the end portion of the tube is swaged inwards to force the collar portion against the frame portion, part of the collar portion lies along said curved outer surface of the outer wall and is deformed to the curvature thereof and the end portion of the roller tube lies along the curved collar portion and is deformed to the curvature thereof.

3. An end cap assembly as claimed in claim 2, wherein the outer surface of the outer wall of the frame portion comprises a plurality of axially extending ribs, each of said ribs being aligned radially with a separate one of said radial webs.

4. A conveyor roller comprising a roller tube and two end cap bearing assemblies fitted one in each end of the tube and adapted to rotatably mount the conveyor roller on a fixed shaft, each of said end cap bearing assemblies comprising a housing of plastics material and a bearing supported in the housing, said housing having an annular frame portion, a resilient collar portion surrounding the frame portion, and an annular bight portion of U-shaped cross-section connecting said collar portion to said frame portion, said frame portion having an axially extending inner wall, an axially extending outer wall, and a plurality of radial webs spaced around said frame portion and extending between said inner and outer walls thereof, said outer wall being formed on the outer surface thereof with a plurality of axially extending ribs each of which is aligned radially with a separate one of said webs, so as to provide a substantially rigid structure to said frame portion in which a load acting on the outer wall thereof is transmitted through said webs and distributed substantially evenly along the inner wall, said bearing being mounted as a force fit in the bore defined by said inner wall of the frame portion, said collar portion having an annular wall which is normally cylindrical in an unstressed condition and which is formed at one end thereof with an outwardly projecting radial flange, and said bight portion having one limb thereof integral with and aligned with the outer end of the annular wall of said collar portion and the other limb of said bight portion being integral with and aligned with an end of said outer wall of the frame portion, the outer surfaces of at least the end portions of said ribs remote from said bight portion being curved radially inwards in the direction away from said bight portion, the annular wall of the collar portion being a close fit within the roller tube with said radial flange abutting the end of the roller tube, and the end of the roller tube being swaged inwardly onto said collar portion so as to force the collar portion against the frame portion, whereby part of the collar portion lies along the curved ribs on the outer wall of the frame portion and is deformed to the curvature thereof and the end portion of the roller tube lies along the curved collar portion and is deformed to the curvature thereof.

* * * * *